Figure 1:
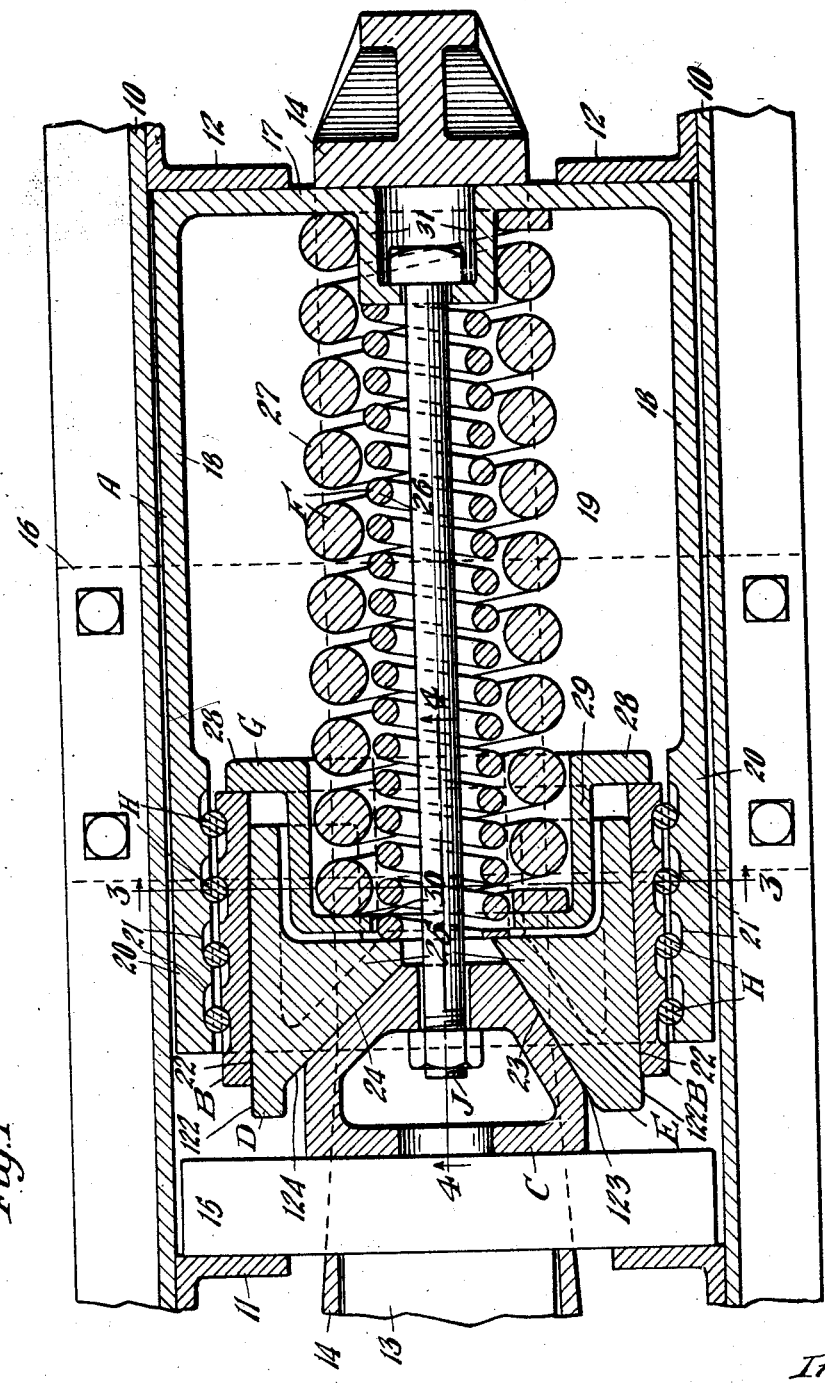

Oct. 30, 1928.

J. F. O'CONNOR 1,689,451

FRICTION SHOCK ABSORBING MECHANISM

Filed Jan. 27, 1927   2 Sheets-Sheet 1

Witness
Wm. Geiger

Inventor
John F. O'Connor
By George D Haight
His Atty.

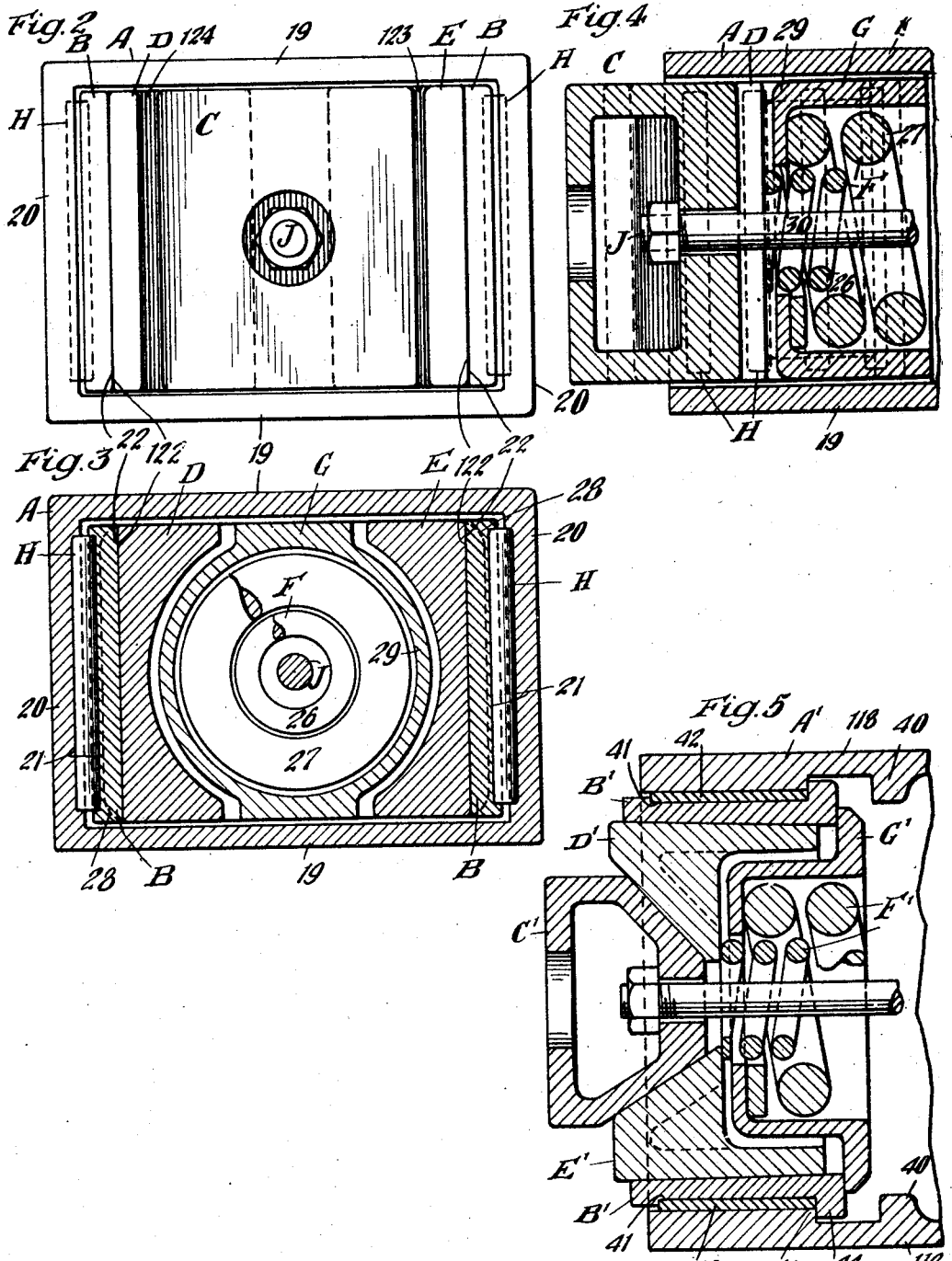

Patented Oct. 30, 1928.

1,689,451

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed January 27, 1927. Serial No. 164,011.

This invention relates to improvements in friction shock absorbing mechanisms.

One object of the invention is to provide a friction shock absorbing mechanism especially adapted for railway draft riggings, affording free spring action during the first part of the compression stroke to absorb the lighter shocks to which the mechanism is subjected followed by heavier frictional resistance during the remainder of the compression stroke to take care of the heavier shocks, wherein the free spring action is obtained by substantially free bodily movement of simple and efficient friction means having co-operating elements, certain of which are arrested upon a predetermined compression of the mechanism to compel relative movement of said friction elements to augment the resistance during the latter part of the compression stroke.

Another object of the invention is to provide a friction shock absorbing mechanism of the character indicated, of simple construction, which may be economically manufactured, including a spring cage, a spring resistance, co-operating friction elements within the cage, certain of which have anti-friction bearing on the cage and limited relative movement with respect to the cage during a predetermined initial portion of the compression stroke, movement of said friction elements in unison, being opposed by the spring resistance to afford relatively light action, wherein the friction elements are relatively movable after said initial compression of the mechanism to augment the resistance offered to thereby absorb the heavier shocks to which the same is subjected.

A more specific object of the invention is to provide a friction shock absorbing mechanism including a spring cage provided with friction elements in the form of liners having limited relative movement longitudinally of the cage, movable friction means co-operating with the liners, anti-friction means interposed between the liners and cage walls; and spring resistance means opposing relative movement of both the liners and friction means with respect to the cage.

Other objects and advantages of the invention will more fully and clearly appear from the description and claims hereinafter following.

In the drawings, forming a part of this specification, Figure 1 is a horizontal, longitudinal, sectional view of a portion of a railway draft rigging, showing one embodiment of my improvements in connection therewith. Figure 2 is a front end elevational view of the shock absorbing mechanism proper illustrated in Figure 1. Figure 3 is a transverse vertical sectional view corresponding substantially to the line 3—3 of Figure 1. Figure 4 is a longitudinal vertical sectional view of the front end of the mechanism illustrated in Figure 1 and corresponding substantially to the line 4—4 of said Figure. And Figure 5 is a horizontal sectional view of the front end portion of the shock absorbing mechanism illustrating another embodiment of the invention.

In said drawings, 10—10 indicate channel shaped center or draft sills of a railway car underframe, to the inner faces of which are secured front stop lugs 11—11 and rear stop lugs 12—12. The inner end of the drawbar is designated by 13, to which is operatively connected a yoke 14 of well known form. The shock absorbing mechanism proper and a main front follower 15 are disposed within the yoke, and the yoke and the parts therewithin are supported by a detachable saddle plate 16 fixed to the draft sills.

Referring first to the embodiment of the invention illustrated in Figures 1 to 4, inclusive, my improved shock absorbing mechanism proper comprises broadly: a spring cage A; a pair of liners B—B; a wedge member C; a pair of friction shoes D and E; a main spring resistance F; a spring follower G; a plurality of anti-friction rollers for the liners H—H; and a retainer bolt J.

The spring cage A is in the form of a substantially hollow box-like casting having a transverse rear end wall 17, longitudinally disposed spaced side walls 18—18 and horizontally disposed longitudinally extending spaced top and bottom walls 19—19. The side walls 18 are thickened at the forward end of the cage as indicated at 20 and are provided with a plurality of spaced seats 21—21 adapted to accommodate the anti-friction rollers H. The rear end wall of the cage 17 co-operates with the stop lugs 12 in the manner of the usual rear follower.

The liners B which are two in number, are disposed at opposite sides of the mechanism and are in the form of relatively heavy substantially rectangular plates. The liners B are of similar design, each being provided with a longitudinally disposed flat friction surface 22 on the inner side thereof adapted to co-operate with the corresponding friction shoe. On the outer side, each liner is provided with a plurality of roller seats similar to the seats 20 on the side walls of the cage, the seats of the liners being also indicated by 21. In the present instance, the side walls of the cage and the liners are each shown as provided with four seats 21, although it will be evident that the number of seats may be varied to correspond with the length of the liners employed. The opposed seats 21 of the side walls of the cage A and the liners B are adapted to accommodate the anti-friction rollers H, four such rollers being employed. The seats 21 are of such a length that the rollers H will travel a predetermined distance along the same before coming into engagement with the end walls of the seats. By engagement of the rollers with the end walls of the seats, inward and outward movement of the liners B is positively limited in a manner hereinafter described. Although the liners and the cage may be formed of any suitable material, I preferably form the cage of steel. In the present instance, the opposed friction surfaces 22 of the liners are shown as converging inwardly of the mechanism. However, it is within my intention to dispose these surfaces parallel to the axis of the mechanism. The wedge member C is in the form of a hollow block having the flat front end face bearing directly on the inner side of the main follower 15. At the inner end, the wedge block C is provided with a pair of inwardly converging wedge faces 23 and 24, the wedge face 23 being preferably disposed at a relatively keen wedge acting angle with respect to the longitudinal axis of the mechanism and the wedge face 24 being disposed at a relatively blunt releasing angle.

The friction shoes D and E which are disposed at opposite sides of the mechanism, are interposed between the wedge block C and the liners B. The shoes D and E are of similar design except as hereinafter pointed out. Each of the shoes is provided with a longitudinally extending flat outer friction surface 122 adapted to co-operate with the friction surface 22 of the liner B at the same side of the mechanism. On the inner side, each friction shoe is provided with a lateral enlargement 25 having a wedge face at the front side thereof, the wedge face of the shoe E being designated by 123 and cooperating with the wedge face 23 of the wedge block C and correspondingly inclined thereto, and the wedge face of the shoe D being designated by 124 and co-operating with the wedge face 24 of the wedge block C and correspondingly inclined thereto. Rearwardly of the enlargement 25, each shoe is cut away to accommodate the front end of the spring follower G as clearly illustrated in Figures 1 and 3.

The main spring resistance F comprises a relatively light inner coil 26 and a heavier outer coil 27. The outer coil 27 has the rear end thereof bearing directly on the end wall 17 of the spring cage and the front end thereof seated within the spring follower G, the latter being in the form of a cup-like cap having a heavy annular flange 28 at the inner end thereof bearing directly on the inner ends of the liners B. The cap portion 29 of the spring follower receives the front end of the coil 27 of the spring and the end wall of said cap is slightly spaced from the inner ends of the enlargements 25 of the friction shoes as most clearly shown in Figure 1. The cap section 29 of the spring follower G is provided with a central opening 30 adapted to loosely receive the front end of the inner coil 26 of the spring resistance and the front end of this coil bears directly on the inner sides of the enlargements 25 of the friction shoes. The rear end of the coil 26 bears on a hollow boss 31 inwardly projecting from the end wall 17 of the cage A.

The mechanism is held assembled and of overall uniform length by the retainer bolt J which has the opposite ends thereof anchored to the cage and wedge block respectively, the head of the bolt being disposed within the hollow boss 31 of the spring cage and the nut of the bolt being disposed within the hollow portion of the wedge block C. In addition to maintaining the mechanism assembled and of overall uniform length, the retainer bolt also serves to maintain the spring resistance F under initial compression. Compensation for wear of the various friction and wedge faces is had by the expansive action of the inner coil 26 of the spring resistance forcing the friction shoes outwardly against the wedge block C.

The operation of my improved shock absorbing mechanism as illustrated in Figures 1 to 4, inclusive, during a compression stroke, is as follows: The spring cage A and the main follower B move relatively toward each other, thereby carrying the wedge block C inwardly of the cage A, forcing the friction shoes into tight frictional engagement with the liners B and also forcing the shoes inwardly of the cage A. During the initial portion of the compression stroke, the wedge C will force the friction shoes D and E inwardly against the resistance of the central coil 26 of the spring, setting up a wedging action between the wedge and the shoes. After the shoes have been forced into tight frictional engagement with the liners B, the latter will be carried inwardly of the spring cage in unison with the wedge block C and the shoes, due to the action of the anti-friction rollers H. The inward movement of the liners B will continue until the rollers engage the rear walls of the pockets 21 on the cage and the front walls of the pockets 21 of the liners, thereby positively limiting inward movement of the liners. This inward movement of the liners B is resisted directly by the outer coil 27 of the spring resistance F and indirectly by the lighter spring 26 which co-operates with the friction shoes. When movement of the liners B is arrested, the friction shoes are compelled to slip inwardly on the friction surface of the liners, thereby greatly augmenting the resistance offered. During this latter stage of the operation, the movement of the shoes will be resisted by both coils of the spring, the enlargements 25 of the shoes coming into engagement with the outer end of the spring follower cap G. The described action will continue either until the actuating force is reduced or the main follower 15 comes into engagement with the outer end of the cage A, whereupon the pressure will be transmitted directly through the cage to the draft sills, preventing the main spring resistance F from being unduly compressed.

When the actuating force is reduced upon release of the mechanism, the spring resistance F, comprising the two coils 26 and 27, will force the friction shoes outwardly, carrying the liners B therewith due to the friction existing between these parts. The liners will finally be arrested in their outward movement by the rollers H coming into engagement with the shoulders at the outer ends of the pockets 21 on the walls of the spring cage and the shoulders at the inner ends of the pockets 21 on the liners. During the further expansion of the spring resistance elements 26 and 27, the spring cap G will be forced outwardly until the flange 28 thereof comes into engagement with the inner end of the liners B, whereupon further outward movement of the spring follower G will be limited. Inasmuch as the inner coil 26 of the spring resistance bears directly on the friction shoes, the same is capable of expansion after the movement of the spring follower G is arrested, thereby forcing the shoes D and E outwardly in spaced relation with reference to the front end of the spring follower cap G as clearly shown in Figure 1, movement of the shoes being arrested by the wedge C, outward movement of which is limited by the retainer bolt J.

Referring next to the embodiment of the invention illustrated in Figure 5, the same comprises a spring cage A' of substantially the same general design as the spring cage A hereinbefore described, differing therefrom only in that the side walls 118 are formed with longitudinally extending flat inner surfaces and provided with lateral shoulders 40 inwardly of said flat surfaces, the shoulders 40 acting as limiting stops to arrest movement of the liners after a predetermined compression of the mechanism. The liners B' are also in the form of substantially rectangular plates having longitudinally disposed inwardly converging friction surfaces on the inner sides thereof, co-operating with the shoes D' and E'. Each liner B' is provided with a seat 41 in which a plate 42 of anti-friction metal is mounted. The plates 42 bear directly on the longitudinal inner surfaces of the side walls 118 of the cage A' and serve to reduce the friction between these parts so that a minimum amount of frictional resistance will be offered to inward movement of the liners B'. The wedge block C', friction shoes D' and E', the spring follower cap G', and the spring resistance F' as shown in Figure 5, are substantially identical in construction and have the same function as the corresponding parts illustrated in Figures 1 to 4, inclusive. The spring resistance F' also comprises two coils, an inner coil bearing directly on the enlargements of the friction shoes and an outer coil bearing directly on the spring follower cap G'.

The operation of the embodiment of the invention illustrated in Figure 5 is substantially the same as the operation of the invention disclosed in Figures 1 to 4, inclusive, hereinbefore described, the liners B' slipping on the side walls of the cage A' with a minimum amount of resistance due to the anti-friction means interposed between these parts. Movement of the liners B' inwardly of the cage A' will be arrested upon the inner ends of the liners coming into engagement with the shoulders 40 of the cage, whereupon during further compression of the mechanism, the friction shoes will be forced to slide on the liners B' with added resistance.

During release, the spring resistance F' will restore all of the elements to normal position, outward movement of the liners B' being limited by shoulders 43 on the side walls of the cage A', the liners being provided with lateral projections 44 adapted to engage the shoulders 43.

From the preceding description taken in connection with the drawings, it will be evident that I have provided a friction shock absorbing mechanism of exceedingly simple design in which a free spring action is afforded during the first part of the compression stroke, by the use of movable liners which have an anti-friction mounting on the cage. It will be evident that the liners themselves may be readily manufactured and that old and worn liners may be replaced by new liners. A decided advantage is thus had over other types of friction draft gears having initial free spring action followed by high frictional resistance, wherein a movable friction shell is employed, by providing liners in place of the usual friction shell, the liners being easily assembled with the cage and requiring simple manufacturing operations only.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage; of liners within the cage and having limited longitudinal movement with respect to the cage less than the full compression stroke of the mechanism; an anti-friction mounting for said liners; friction means adapted for relative movement with respect to said liners; and spring resistance means opposing movement of the liners and friction means inwardly of the cage.

2. In a friction shock absorbing mechanism, the combination with a column member having longitudinally disposed side surfaces; of plate elements movable longitudinally of said column member, and having their movement limited after a predetermined compression of the mechanism; anti-friction means interposed between said elements and column surfaces; friction shoes co-operating with said plate elements; wedge means for forcing said shoes against the plate elements and longitudinally of the column member; and spring resistance means opposing movement of said shoes and plate elements longitudinally of said column member.

3. In a friction shock absorbing mechanism, the combination with a spring cage; of liners within the cage having movement longitudinally of the cage less than the full compression stroke of the mechanism; anti-friction means interposed between the liners and cage walls; friction shoes co-operating with said liners; a wedge block having wedging engagement with the shoes; and spring means opposing movement of said shoes and liners inwardly of the cage.

4. In a friction shock absorbing mechanism, the combination with a spring cage having opposed side walls; of a pair of liners at opposite sides of the mechanism having anti-fraction bearing on said side walls, said anti-friction bearing limiting movement of the liners inwardly of the cage to an extent less than the full compression stroke of the mechanism; friction shoes co-operating with said liners; pressure transmitting wedge means engaging the shoes; and spring resistance means within the cage opposing inward movement of said shoes and liners.

5. In a friction shock absorbing mechanism, the combination with a spring cage having opposed side walls; of liners slidable on said side walls; anti-friction rollers interposed between said side walls and liners; abutment means on said liners and cage co-operating with said rollers for limiting movement of said liners inwardly of the cage to an extent less than the full compression stroke of the mechanism; friction shoes co-operating with the liners; pressure transmitting means having wedging engagement with the shoes; and spring resistance means within the cage yieldingly opposing inward movement of said liners and shoes.

6. In a friction shock absorbing mechanism, the combination with a spring cage; of liners within said cage and relatively movable longitudinally thereof to a predetermined limited extent; an anti-friction mounting for said liners and limiting the movement of said liners to less than the full compression stroke of the mechanism; friction shoes co-operating with the liners; pressure transmitting means having wedging engagement with said shoes; spring resistance means directly opposing movement of the shoes inwardly of the mechanism; and spring resistance means opposing movement of the liners inwardly of the mechanism.

7. In a friction shock absorbing mechanism, the combination with a spring cage; of liners having movement inwardly of the cage during part only of the compression stroke of the mechanism, said liners having longitudinally disposed friction surfaces; an anti-friction mounting for said liners; friction shoes co-operating with the liners; wedge means having engagement with the shoes; spring resistance means within the cage, including a relatively heavy coil and a lighter coil; and a spring follower interposed between said heavy coil and the liners, and said lighter coil bearing directly on the shoes.

8. In a friction shock absorbing mechanism, the combination with a spring cage; of opposed liners having movement longitudinally of the cage to an extent less than the full compression stroke of the mechanism, said liners having longitudinally disposed friction surfaces converging inwardly of the mechanism; an anti-friction mounting for said liners; friction shoes co-operating with the friction surfaces of the liners; wedge means engaging said shoes; and spring resistance means within the cage yieldingly opposing inward movement of the liners and shoes.

9. In a friction shock absorbing mechanism, the combination with a rectangular spring cage having opposed side walls; of a pair of opposed liners within the cage slidable inwardly of the cage on said side walls and having their movement arrested when the mechanism has been partially compressed, said liners having longitudinally disposed friction surfaces; an anti-friction mounting for said liners; friction shoes co-operating with said liners; wedge means having wedging engagement with the shoes; and spring resistance means within the cage, including a heavy outer coil interposed between the liners and the cage and a lighter inner coil, said inner coil being directly interposed between the cage and the shoes.

In witness that I claim the foregoing I have hereunto subscribed my name this 24th day of January, 1927.

JOHN F. O'CONNOR.